Figure 1:
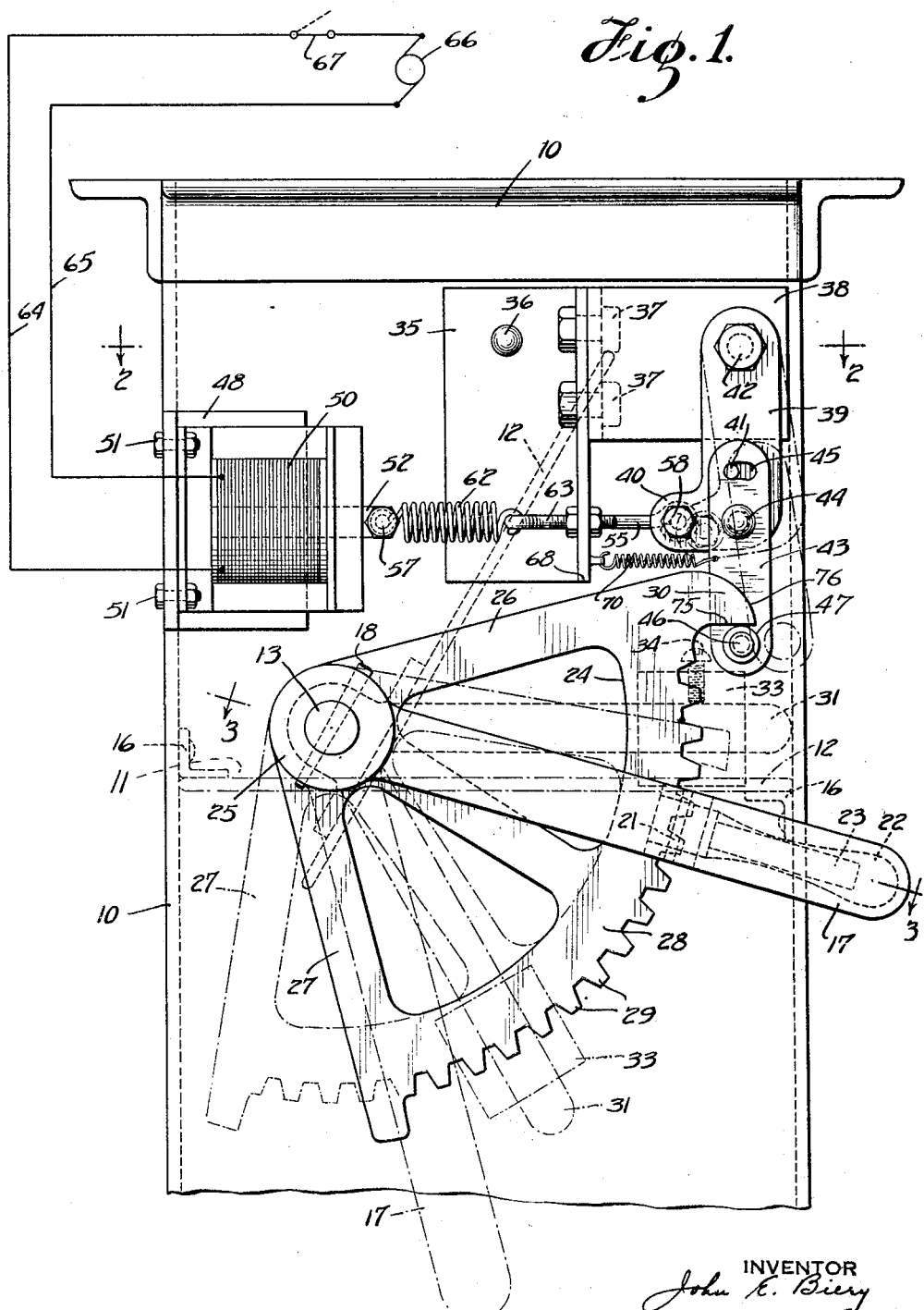

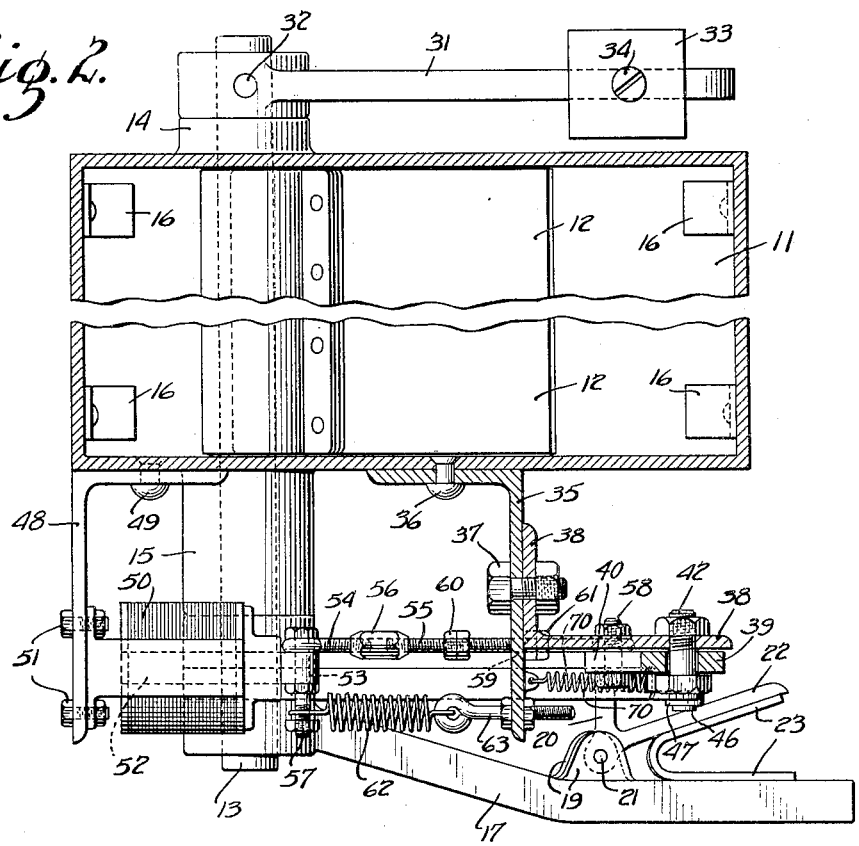

Patented Feb. 7, 1933

1,897,000

UNITED STATES PATENT OFFICE

JOHN E. BIERY, OF GRANTWOOD, NEW JERSEY, ASSIGNOR TO FOSTER WHEELER CORPORATION, OF NEW YORK, N. Y., A CORPORATION OF NEW YORK

CLOSURE OPERATING MECHANISM

Application filed October 1, 1930. Serial No. 485,622.

This invention relates to closures and more particularly relates to operating mechanism for closures.

The primary object of the present invention is to provide operating mechanism for closures which will permit the closure to be opened to any desired degree, will retain the closure in its open position and will automatically release the closure and move it to closed position when desired.

Other objects, features and characteristics of the invention will be apparent from the following description taken in connection with the accompanying drawings forming a part thereof, in which:

Fig. 1 is a view in elevation of the closure operating mechanism of the present invention, Fig. 2 is a transverse sectional view taken substantially on line 2—2 of Fig. 1, and Fig. 3 is a sectional view taken on line 3—3 of Fig. 1.

Referring to the drawings, 10 represents a member which may be an air or fuel conduit having an opening 11 therein. As shown, the member 10 is of rectangular cross-section, but may be of any other desired configuration. A closure 12 adapted to close the opening 11 is mounted in the member 10 and is fixed to a shaft 13 which is rotatably mounted in bosses 14 and 15 on member 10. Stops 16 mounted in member 10 are engaged by the closure when it is in closed position. Shaft 13 extends beyond the ends of the bosses 14 and 15 as shown, and on the end of the shaft which extends beyond boss 15, an operating lever 17 is mounted and is fixed thereto by a pin 18 or by other suitable means. Adjacent the outer or free end of operating lever 17 is a pair of spaced bosses 19 to which is pivotally mounted a pawl 20 by means of a pin 21. Pawl 20 is adapted to be swung on its pivot by a lever 22 extending laterally therefrom. Pawl 20 is urged about its pivot in a direction toward shaft 13 by means of a U-shaped spring 23 disposed between operating lever 17 and lever 22.

Mounted on shaft 13 so as to freely rotate thereon between the outer end of boss 15 and lever 17 is a ratchet 24, constituting an adjusting member. The ratchet 24 preferably comprises a hub 25, spaced arms 26 and 27 extending radially therefrom and an arcuate portion 28 having a plurality of teeth 29 thereon. The arm 26 has a latch engaging portion 30 which extends in a generally radial direction somewhat beyond the outer edge of teeth 29 and is provided with an arcuate cam surface 76 and a surface 75 which is adapted to be engaged by a latch member, presently to be described, to retain ratchet 24 in open position.

On the end of shaft 13 which extends beyond the outer end of boss 14 on member 10 is a closing lever 31 which is fixed to shaft 13 by pin 32 or other suitable means and has a weight 33 which may be adjusted in any desired position on lever 31 by means of an adjusting screw 34.

Mounted on the side of member 10 on which ratchet 24 is disposed and above and to one side of shaft 13 as viewed in Fig. 1 is an angle bracket 35 which is secured to member 10 by rivets 36 or other convenient means, and secured to bracket 35 by bolts 37 is an angle bracket 38. A lever 39 having a laterally extending portion 40 at its free end and a pin 41 extending therefrom intermediate its ends is pivotally mounted to bracket 38 by means of a bolt 42. A latch 43 is pivotally mounted to the outer end of lever 39 by any suitable means, such as bolt 44, and has an arcuate slot 45 in which pin 41 on lever 39 is adapted to move to limit the pivotal movement of latch 43 with respect to lever 39. Fixed on the lower end of lever 43 as seen in Fig. 1 is a shouldered stud 46 and mounted so as to freely rotate thereon is a roller 47 which is adapted to engage the surface 75 of the latch engaging portion 30 to retain ratchet 24 in open position. The cam surface 76 on latch engaging portion 30 is adapted to engage the roller 47 on latch 43 to cam the latch 43 to the right as seen in Fig. 1 when ratchet 24 and closure 12 are swung to open position to permit the roller 47 on the latch to engage the surface 75 and retain the closure in open position. A spring 70 connected to latch 43 and bracket 35 urges the latch toward ratchet 24.

Mounted on a bracket 48 secured to member 10 by rivets 49 or other suitable securing means in a position somewhat above and to the left of shaft 13, as seen in Figs. 1 and 2, is a solenoid 50 which is secured to the bracket 48 by bolts 51. Solenoid 50 has a movable core 52 which is provided with an aperture 53 adjacent its outer end. Core 52 of the solenoid is connected to lever 39 by means of a link comprising an eyebolt 54 and a threaded rod 55 connected together by a turnbuckle 56. Eyebolt 54 is secured to core 52 of the solenoid by means of a bolt 57 which passes through aperture 53 in the outer end of the core. Rod 55 is conveniently secured to the laterally extending portion 40 of lever 39 by a bolt 58. As shown, rod 55 passes through an aperture 59 in bracket 35 and nuts 60 and 61 threaded on rod 55 at desired points provide stops to limit axial movement of rod 55 in either direction. As shown, core 52 of the solenoid is urged outwardly of the solenoid or in a direction toward latch 43 by means of a suitable tension spring 62 connected at one end to core 52 by means of bolt 57 and at its other end to bracket 35 by means of an eyebolt 63 secured to the bracket. The solenoid 50 is connected in a suitable electrical circuit having leads 64 and 65, a suitable source of electrical power 66 and a switch 67 of any desired type.

The lower edge 68 of the outwardly extending leg of bracket 35 serves as a stop to limit upward or counter-clockwise movement of ratchet 24.

The operation is as follows: Closure 12 is moved to open position by means of operating lever 17 which is fixed to shaft 13 on which the closure is fixedly mounted. The degree to which closure 12 is opened is determined by the position of operating lever 17 with respect to ratchet 24. Ratchet 24 is freely rotatable on shaft 13 and it is apparent that after the operator has moved lever 22 toward operating lever 17 and thus disengaged pawl 20 from engagement with teeth 29 of the ratchet 24, the ratchet may be moved relative to operating lever 17 until the desired adjusted position is reached, after which, the operator releases lever 22, and pawl 20 is pressed into engagement with teeth 29 by the spring 23. After the desired adjustment has been made, the operator moves operating lever 17 in a counter-clockwise direction until arm 26 of ratchet 24 comes into engagement with the lower edge 68 of bracket 35. If switch 67 is in closed position and solenoid 50 is energized, latch 43 will be in its extreme left hand position as seen in Fig. 1, which I will term its operative position, and as the operating handle 17 nears the limit of its movement for the adjusted position of closure 12, cam surface 76 on the latch engaging portion 30 of the ratchet 24 will engage the roller 47 on latch 43 and press the latch a sufficient distance toward the right as viewed in Fig. 1, to permit the latch engaging portion 30 to pass the roller 47 on latch 43, after which, the latch will move toward its operative position and the roller 47 will engage the surface 75 and hold the ratchet 24 and closure 12 in open position. In the event switch 65 is in open position and solenoid 48 is deenergized when the closure 12 is moved toward open position, it is merely necessary to energize the solenoid by closing switch 65 in order that latch 43 will be held in operative position and pawl 24 and the closure 12 will be retained in open position as previously described. Closure 12 is shown in dotted lines in Fig. 1 in one of its adjusted open positions, the corresponding positions of ratchet 24 and operating handle 17 are shown in full lines and the corresponding position of closing lever 31 in dotted lines.

When it is desired to close the closure, switch 67 is opened, either manually or by any suitable mechanism or means, solenoid 50 is deenergized and core 52 of the solenoid is moved toward the right as viewed in Figs. 1 and 2 by the action of spring 62. This movement moves rod 55 to the right and swings lever 39 about its pivot 42 in a counter-clockwise direction and carries with it the latch 43 which is thus moved to inoperative position. This movement of latch 43 releases ratchet 24, and the weight 33 on closing lever 31 moves closure 12 to its closed position against stops 16. The closed position of closure 12 and the corresponding positions of ratchet 24, operating lever 17 and closing lever 31 are shown in dot and dash lines in Fig. 1. The closure remains in closed position until it is again opened by means of operating lever 17, and the various parts are caused to function as heretofore described to retain the closure in open position and to automatically close it.

This arrangement is applicable generally to any mechanism or device in the operation of which it is necessary or desirable to close a conduit or opening utilized for conveying or passing gaseous fuels, either vapor or gas, due to the interruption of electrical current and is particularly well adapted to ball mills for pulverizing coal to control the supply of air delivered to the mill. When utilized for this purpose, it may advantageously be employed to shut-off the preheated air delivered to the mill in the event the coal discharge from the mill is suddenly stopped, due to failure of the exhauster motor to function, in order to avoid an explosion in the mill.

The form of invention herein disclosed is to be considered a preferred form only and it is understood the invention is not to be limited except by the scope of the appended claims.

What I claim is:

1. A device of the character described, comprising a member having an opening, a closure for the opening, means for opening the closure, a latch having operative and inoperative positions and adapted to hold the closure in open position, a solenoid having a movable core adapted to move the latch to, and retain it in, operative position, a connection between the core and the latch, said connection having means for limiting the movement of the latch, resilient means connected to the core and adapted to move the latch to inoperative position when the solenoid is deenergized and means for closing the closure.

2. A device of the character described comprising a member having an opening, a closure for the opening, a lever connected to the closure for opening the closure, an adjustable member associated with the closure and adjustable with respect thereto and adapted to be connected in adjusted position to said lever, a latch for engaging the adjustable member to hold the closure in open position, means for releasing the latch and means for automatically closing the closure when the latch is released.

3. A device of the character described comprising a member having an opening, a closure for the opening, a lever connected to the closure for opening the closure, an adjustable member having a plurality of notches and a latch engaging portion, means on the lever for engaging in the notches on the adjustable member, a latch adapted to engage the latch engaging portion of the adjustable member to hold the closure in open position, means for releasing the latch from said latch engaging portion and means for closing the closure.

4. A device of the character described comprising a member having an opening, a closure for the opening mounted on a movable shaft carried by said member, a lever fixed to the shaft and adapted to move the closure to open position, an adjustable member mounted on the shaft and adapted to move freely thereon and having a latch engaging portion, means on the lever for engaging the adjustable member, a latch for engaging the latch engaging portion of the adjustable member to thereby hold the closure in open position, means for releasing the latch from the latch engaging portion of the adjustable member and means for closing the closure.

5. A device of the character described comprising a member having an opening, a closure for the opening mounted on a rotatable shaft carried by the member, a lever fixed to the shaft and adapted to open the closure, said lever having a pawl thereon, a ratchet on said shaft and freely movable thereon, means for causing said pawl to engage said ratchet in adjusted position whereby the closure may be opened to an adjusted position, a latch having operative and inoperative positions and adapted to engage the ratchet to hold the closure in open position, a solenoid for moving the latch to operative position, a spring for moving the latch to inoperative position and means for closing the closure.

6. A device of the character described comprising a member having an opening, a closure for the opening mounted on a rotatable shaft carried by the member, a lever fixed to the shaft for opening the closure, a pawl pivotally mounted on the lever, a ratchet mounted on the shaft and adapted to move freely thereon and having a latch engaging portion, said pawl being adapted to engage the ratchet in adjusted position whereby the closure may be opened to adjusted position, a lever pivoted to the member, a latch pivotally mounted on said lever having operative and inoperative positions and adapted to engage the latch engaging portion of the ratchet to thereby hold the closure in open position, a solenoid having a movable core, a connection between the core and the second mentioned lever, means on the connection for limiting the movement of the second mentioned lever, means for energizing the solenoid to move the latch to, and retain it in, operative position to hold the closure in open positon, a spring between the core and said member adapted to move the latch to inoperative position and release said ratchet when the solenoid is deenergized, a closing lever, and means for moving the closure to closed position comprising a closing lever fixed to said shaft and having a weight adjustably mounted thereon.

7. A device of the character described comprising a member having an opening, a closure for the opening, means for opening the closure, means associated with the closure and adjustable with respect thereto and to said first mentioned means, means for engaging said second mentioned means for holding the closure in open position, means for releasing said holding means and means for closing the closure.

In testimony whereof I have affixed my signature.

JOHN E. BIERY.